(12) United States Patent
Wan et al.

(10) Patent No.: US 8,780,769 B2
(45) Date of Patent: Jul. 15, 2014

(54) METHOD, APPARATUS, AND SYSTEM FOR IDENTIFYING DIFFERENT FRAME STRUCTURES

(75) Inventors: Lei Wan, Shenzhen (CN); Yongxia Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 13/228,788

(22) Filed: Sep. 9, 2011

(65) Prior Publication Data

US 2011/0317597 A1   Dec. 29, 2011

Related U.S. Application Data

(63) Continuation of application No. PCT/CN2009/070751, filed on Mar. 11, 2009.

(51) Int. Cl.
  *H04J 1/00* (2006.01)
  *H04W 72/12* (2009.01)
  *H04L 27/26* (2006.01)

(52) U.S. Cl.
  CPC ....... *H04W 72/1289* (2013.01); *H04L 27/2602* (2013.01)
  USPC ........................................ 370/281

(58) Field of Classification Search
  None
  See application file for complete search history.

(56) References Cited

U.S. PATENT DOCUMENTS

| 5,966,670 | A | 10/1999 | Keskitalo et al. | |
|---|---|---|---|---|
| 6,816,507 | B1 | 11/2004 | Jarbot et al. | |
| 2002/0126650 | A1 | 9/2002 | Hall et al. | |
| 2004/0132471 | A1 | 7/2004 | Pappalardo et al. | |
| 2005/0135295 | A1 | 6/2005 | Walton et al. | |
| 2007/0104089 | A1 | 5/2007 | Mujtaba | |
| 2010/0097978 | A1* | 4/2010 | Palanki et al. | 370/315 |
| 2011/0007658 | A1* | 1/2011 | Lindoff et al. | 370/252 |

FOREIGN PATENT DOCUMENTS

| CN | 1960209 | 5/2007 |
|---|---|---|
| CN | 1960352 | 5/2007 |

(Continued)

OTHER PUBLICATIONS

International Search Report, mailed Dec. 24, 2009, in International Application No. PCT/CN2009/070751 (6 pp.).

(Continued)

*Primary Examiner* — Minh-Trang Nguyen
(74) *Attorney, Agent, or Firm* — Staas & Halsey LLP

(57) ABSTRACT

Embodiments of the present invention disclose a method, an apparatus, and a system for identifying different frame structures to ensure backward compatibility of an LTE-advanced (LTE-A) network. The method for identifying different frame structures includes: receiving a radio frame on a frequency division duplex (FDD) downlink carrier, where the radio frame includes an identifier of a frame structure; and identifying the frame structure according to the identifier of the frame structure included in the radio frame. Embodiments of the present invention also disclose a user equipment (UE), an evolved NodeB (eNB), and a system for identifying different frame structures. Through the technical solutions provided by embodiments of the present invention, LTE-A users can identify the frame structure carried on the FDD downlink carrier when accessing the network initially, but LTE users are unaware of the change of the frame structure.

17 Claims, 3 Drawing Sheets

(56) References Cited

FOREIGN PATENT DOCUMENTS

| | | |
|---|---|---|
| CN | 1964221 | 5/2007 |
| CN | 1964222 | 5/2007 |
| CN | 101106395 | 1/2008 |
| CN | 101160997 | 4/2008 |
| CN | 101286798 | 10/2008 |
| CN | 101394219 | 3/2009 |
| CN | 101453293 | 6/2009 |
| CN | 101741452 | 6/2010 |
| CN | 101754230 | 6/2010 |
| WO | 2008/070761 | 6/2008 |

OTHER PUBLICATIONS

Office Action, dated Jan. 30, 2013, in corresponding Chinese Application No. 200980119200.6 (15 pp.).

Written Opinion of the International Searching Authority mailed Dec. 24, 2009 issued in corresponding International Patent Application No. PCT/CN2009/070751.

Extended European Search Report dated Mar. 26, 2012 issued in corresponding European Patent Application No. 09841319.8.

* cited by examiner

METHOD, APPARATUS, AND SYSTEM FOR IDENTIFYING DIFFERENT FRAME STRUCTURES

CROSS-REFERENCE TO RELATED APPLICATIONS

This application is a continuation of International Application No. PCT/CN2009/070751, filed on Mar. 11, 2009, which is incorporated herein by reference in its entirety.

FIELD OF THE INVENTION

The present invention relates to radio communication technologies, and in particular, to a method, an apparatus, and a system for identifying different frame structures.

BACKGROUND OF THE INVENTION

So far, only the asymmetric time division duplex (time division duplex, TDD) spectrums and symmetric frequency division duplex (frequency division duplex, FDD) spectrums are available. In a TDD system, uplink and downlink signals are sent on the same carrier on a time division basis, and the uplink and downlink channels are reciprocal. In an FDD system, the bidirectional communication of receiving and transmitting is implemented on two separate symmetric frequency channels; a guard band is used to separate the receiving and transmitting channels; an uplink carrier only sends uplink signals and a downlink carrier only sends downlink signals.

FIG. 1 shows an existing FDD frame structure in a 3GPP LTE (long term evolution) network. A 10 ms radio frame includes 10 radio subframes; each radio subframe is a 1 ms downlink subframe, and each downlink subframe includes two 0.5 ms timeslots. Because a sounding reference symbol (sounding reference symbol, SRS) of the FDD system can only be sent on an uplink carrier, an evolved NodeB (eNB) cannot obtain the channel information of a downlink carrier according to the conventional measurement of the SRS of the uplink band.

Advanced multi-antenna technologies, including downlink coordinated multi-point transmission (coordinated multi-point transmission, CoMP) and beam forming (beam forming, BF), require the eNB to obtain complete channel information of the downlink carrier, but the existing FDD system can only feed back quantized and encoded channel information of the downlink carrier through the uplink control channel of the uplink carrier. Because the eNB cannot obtain complete channel information of the downlink carrier and can only obtain channel information of the downlink carrier on the basis of uplink feedback information, the system performance is deteriorated greatly.

One solution provided in the prior art is as follows: The downlink carrier carries an uplink SRS to achieve the reciprocity of uplink and downlink channels of the downlink carrier, so that the downlink channel information can be obtained. The eNB obtains the downlink channel information by measuring the uplink SRS sent on the downlink carrier, and may obtain complete and accurate downlink channel information easily. Therefore, the advanced multi-antenna technologies such as CoMP and BF can be used effectively, uplink band overheads can be reduced significantly, and the imbalance of the uplink and downlink of the existing FDD system is improved.

During the implementation of the present invention, the inventor finds the following problems in the prior art:

The FDD downlink carrier carries an uplink SRS. Therefore, the FDD downlink carrier may carry two frame structures, one frame structure is the existing frame structure in the LTE network shown in FIG. 1, and the other frame structure is a new frame structure carrying uplink timeslots/subframes. After the new frame structure is introduced, LTE-advanced (LTE-advanced, LTE-A) users need to identify the new frame structure when accessing the network initially, and then can perform normal communication; the original LTE users should be unaware of the change of the frame structure, and finish the initial access process in the LTE-A network normally, so as to ensure backward compatibility of the LTE-A network.

SUMMARY OF THE INVENTION

In view of this, embodiments of the present invention provide a method, an apparatus, and a system for identifying different frame structures to ensure backward compatibility of the LTE-A network.

An embodiment of the present invention provides a method for identifying different frame structures, and the method includes: receiving a radio frame on an FDD downlink carrier, where the radio frame includes an identifier of a frame structure; and identifying the frame structure according to the identifier of the frame structure included in the radio frame.

An embodiment of the present invention provides a user equipment (UE), including: a receiving unit, configured to receive a radio frame on an FDD downlink carrier, where the radio frame includes an identifier of a frame structure; and an identifying unit, configured to identify the frame structure according to the identifier of the frame structure included in the radio frame.

An embodiment of the present invention provides an eNB, including: a generating unit, configured to generate a radio frame, where the radio frame includes an identifier of a frame structure; and a sending unit, configured to send the radio frame generated by the generating unit on an FDD downlink carrier.

An embodiment of the present invention provides a system for identifying different frame structures, and the system includes: an eNB and a UE. The eNB includes: a generating unit, configured to generate a radio frame, where the radio frame includes an identifier of a frame structure; and a sending unit, configured to send the radio frame generated by the generating unit on an FDD downlink carrier. The UE includes: a receiving unit, configured to receive the radio frame on the FDD downlink carrier; and an identifying unit, configured to identify the frame structure according to the identifier of the frame structure included in the radio frame.

As seen from the above technical solutions provided by embodiments of the present invention, a radio frame including an identifier of a frame structure is received on an FDD downlink carrier, and the frame structure is identified according to the identifier of the frame structure included in the radio frame; therefore, LTE-A users can identify the frame structure carried on the FDD downlink carrier when accessing the network initially, and can perform normal network access, while LTE users are unaware of the change of the frame structure, so as to ensure backward compatibility of the LTE-A network.

BRIEF DESCRIPTION OF THE DRAWINGS

To describe the technical solutions in the embodiments of the present invention or in the prior art more clearly, the following outlines the accompanying drawings required in the description of the embodiments of the present invention or the prior art. Apparently, the accompanying drawings illustrate only some exemplary embodiments of the present invention, and persons of ordinary skill in the art can derive other drawings from these drawings without any creative effort.

DETAILED DESCRIPTION OF THE EMBODIMENTS

The technical solutions provided in the embodiments of the present invention are hereinafter described clearly and completely with reference to the accompanying drawings. Apparently, the embodiments are only part of, rather than all of embodiments of the present invention. Other embodiments that those skilled in the art derive from embodiments of the present invention also fall within the protection scope of the present invention.

The normal network access procedure for LTE users (including FDD users and TDD users) is as follows: During initial power-on, the user performs downlink synchronization according to a synchronization channel information, obtains a demodulated downlink reference symbol after obtaining downlink synchronization, then receives a physical broadcast channel (PBCH, physical broadcast channel) at a fixed location, decodes the PBCH to obtain certain information, then receives a physical control format indicator channel (PCFICH, physical control format indicator channel), further receives a physical downlink control channel (PDCCH, physical downlink control channel), then decodes a physical downlink share channel (PDSCH, physical downlink shared channel), obtains contents of a dynamic broadcast channel (DBCH, dynamic broadcast channel), performs uplink synchronization after obtaining certain information of an uplink random access channel (RACH, random access channel), and initiates registration after uplink synchronization; a default bearer is set up after the registration, so that the user can access the network to perform normal communication.

Figure 1:
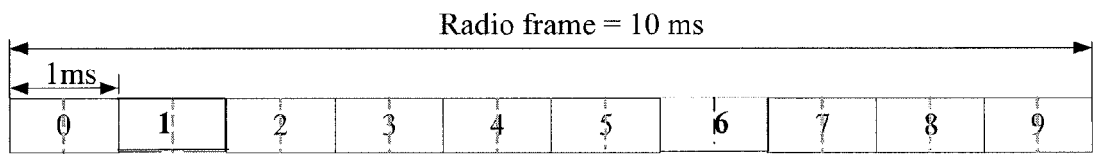
FIG. 1 illustrates an existing FDD frame structure of a 3GPP LTE network.

The downlink synchronization channel of the LTE network mainly includes two primary synchronization symbols (PSSs, primary synchronization symbols) and two secondary synchronization symbols (SSSs, secondary synchronization symbols). For the FDD frame structure in FIG. 1, one FDD PSS is located on the last symbol of the first timeslot of subframe 0 and the other FDD PSS is located on the last symbol of the first timeslot of subframe 5, while one FDD SSS is located on the second to last symbol of the first timeslot of subframe 0 and the other FDD SSS is located on the second to last symbol of the first timeslot of subframe 5, that is, the two FDD SSSs are located on the symbols before the two PSSs respectively. For the TDD frame structure, the two TDD PSSs are located on the third symbols in DwPTSs respectively, while one TDD SSS is located on the last symbol of the second timeslot in subframe 0 and the other TDD SSS is located on the last symbol of the second timeslot in subframe 5. The PBCH of the LTE network is located on the first four symbols of the second timeslot in subframe 0. The DBCH of the LTE network is located on the PDSCH, and the specific frequency location of the DBCH on the PDSCH needs to be specified by the PDCCH of the current subframe; the PCFICH is always located on the first orthogonal frequency division multiplexing (OFDM) symbol of each downlink subframe, specifying the number of symbols occupied by the PDCCH.

Figure 2:
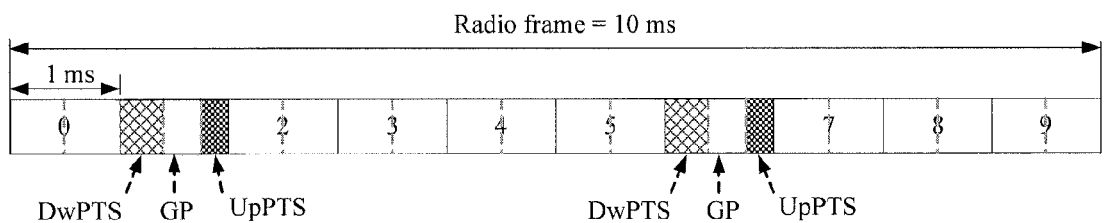
FIG. 2 illustrates an FDD frame structure carrying uplink timeslots/subframes according to an embodiment of the present invention.

FIG. 2 illustrates a new FDD frame structure carrying uplink timeslots/subframes according to an embodiment of the present invention. In the frame structure shown in FIG. 2, a 10-ms radio frame includes ten 1-ms subframes, and the ten 1-ms subframes include eight ordinary downlink subframes and two special subframes. An ordinary subframe includes two 0.5-ms timeslots, and a special subframe includes an uplink timeslot, a guard period, and/or a downlink timeslot, where the uplink timeslot may be an uplink pilot timeslot (uplink pilot timeslot, UpPTS) and the downlink timeslot may be a downlink pilot timeslot (downlink pilot timeslot, DwPTS). The uplink timeslot may carry an SRS. In this way, the FDD downlink carrier can carry an uplink SRS.

In addition, if all UpPTSs in the special subframe are used for the SRS, an LTE-A user can complete sounding of all bandwidths of the downlink carrier channel without requiring that every 10-ms radio frame (that is, every radio frame) includes two special subframes. The present invention provides another new FDD frame structure. In the new frame structure, N 10-ms radio frames only include one or two special subframes (N is an integer greater than 1), and the value of N may be notified through a reserved bit of the PBCH or DBCH.

Figure 3:
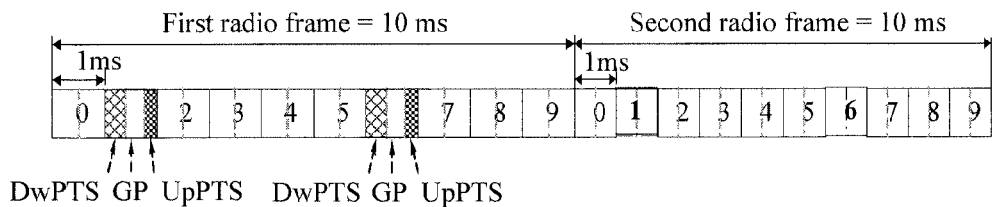
FIG. 3 illustrates another FDD frame structure carrying uplink timeslots/subframes according to an embodiment of the present invention.

FIG. 3 illustrates another new FDD frame structure provided by the present invention. In the frame structure shown in FIG. 3, N=2, that is, every two radio frames make up a frame structure period; in each frame structure period, the first radio frame includes two special subframes, for example, the two special subframes are located on subframe 1 and subframe 6 respectively, and the second radio frame includes no special subframe. Each special subframe still includes: an uplink timeslot and/or a GP and/or a downlink timeslot, where the uplink timeslot may carry an SRS. In this way, the FDD downlink carrier can carry an uplink SRS.

To ensure backward compatibility of the LTE-A network, that is, to enable an LTE user to access the LTE-A network normally and communicate normally with an eNB that uses an FDD downlink carrier to carry an uplink SRS (hereinafter referred to as an LTE-A eNB). As seen from the above network access procedure of the LTE user, the new frame structure carried by the FDD downlink carrier of the LTE-A eNB must have the same synchronization structure, PBCH, PCFICH, PDCCH, and PDSCH as in the original access process of the LTE FDD user. For the synchronization structure, one FDD PSS still must be located on the last symbol of the first timeslot of subframe 0 and the other FDD PSS still must be located on the last symbol of the first timeslot of subframe 5, while one FDD SSS still must be located on the second to last symbol of the first timeslot of subframe 0 and the other FDD SSS still must be located on the second to last symbol of the first timeslot of subframe 5.

Therefore, the LTE user can access the LTE-A network normally, and the LTE user is not scheduled in the special subframes to ensure that the LTE user communicates with the LTE-A eNB normally, and to ensure backward compatibility of the LTE-A network. However, the LTE-A user must differentiate different frame structures carried on the FDD downlink carrier to identify the new frame structure when the network is accessed initially, thereby ensuring normal communication.

Therefore, an embodiment of the present invention provides a method for identifying different frame structures; in this method, the eNB adds at least one PSS on the basis of the original synchronization structure. For example, the eNB may add two PSSs, where the two new PSSs may be carried on the third symbols of the DwPTSs respectively, or may be located on other symbols, but the locations should be fixed. In this way, the LTE-A user confirms that the FDD downlink carrier carries a new frame structure as long as the LTE-A user detects more than two PSSs in a 10-ms radio frame such as three or four PSSs.

It should be noted in this embodiment that: Because the added PSS may be in the same location as the PSS of the TDD system, to prevent the LTE TDD user from accessing the LTE FDD downlink carrier, the FDD downlink carrier may not carry the SSS of the TDD system any longer. In this way, the LTE TDD user certainly cannot synchronize with the LTE FDD downlink carrier, and the FDD downlink carrier cannot be accessed.

Accordingly, an embodiment of the present invention provides a method for identifying different frame structures; in this method, the eNB adds at least one SSS on the basis of the original synchronization structure, for example, adds two SSSs, where the two new SSSs may be carried on the last symbol of subframe 0 and subframe 5 respectively, or may be located on other symbols but the locations must be fixed. In this way, the LTE-A user confirms that the FDD downlink carrier carries a new frame structure as long as the LTE-A user detects more than two SSSs in a 10-ms radio frame such as three or four SSSs.

It should be noted in this embodiment that: Because the added SSS may be in the same location as the SSS of the TDD system, to prevent the LTE TDD user from accessing the LTE FDD downlink carrier, the FDD downlink carrier may not carry the PSS of the TDD system any longer. In this way, the LTE TDD user certainly cannot synchronize with the LTE FDD downlink carrier and the FDD downlink carrier cannot be accessed.

In case that the eNB adds no PSS or SSS, an embodiment of the present invention provides another method for identifying different frame structures; in this method, the eNB uses the one reserved bit on the original PBCH to directly indicate whether the FDD downlink carrier carries a new frame structure or an original frame structure.

For the LTE user, because the bit reserved in the PBCH does not need to be parsed, the LTE user can access the network according to the original access procedure, and the LTE FDD user can access the LTE-A network normally; the LTE user is not scheduled in the special subframes so as to ensure that the LTE user communicates with the LTE-A eNB normally, and to ensure backward compatibility of the LTE-A network.

An embodiment of the present invention provides another method for identifying different frame structures; in this method, the eNB uses one reserved bit on the original DBCH to directly indicate whether the FDD downlink carrier carries a new frame structure or an original frame structure. Alternatively, the eNB uses a state reserved by the existing uplink/downlink subframe ratio field on the DBCH to directly indicate whether the FDD downlink carrier carries a new frame structure or an original frame structure.

For the LTE user, because the bit or state reserved in the DBCH does not need to be parsed, the LTE user can access the network according to the original access procedure, and the LTE FDD user can access the LTE-A network normally; the LTE user is not scheduled in the special subframes so as to ensure that the LTE user communicates with the LTE-A eNB normally, and to ensure backward compatibility of the LTE-A network.

It should be noted that, to get better compatible with the LET system, the future LTE-A system may support wider bandwidths by carrier aggregation; two or more carriers are aggregated, and each carrier may be called a component carrier. A UE may receive data over one or more component carriers simultaneously or transmit data over one or more component carriers simultaneously according to capabilities of the UE and service requirements.

Carrier aggregation may be the aggregation of multiple carriers of a continuous or discrete spectrum. Among the carriers that are aggregated, the bandwidth of one carrier may be the same as or different from the bandwidth of another. For example, a 5-MHz carrier may be aggregated with a 10-MHz carrier. In practice, carrier aggregation depends on capabilities of the UE, service requirements, and network configuration. For example, for N downlink carriers and M uplink carriers configured in the network, a high-capability UE may use the N downlink carriers and M uplink carriers, and a low-capability UE may use only part of the N downlink carriers, and can transmit data over only part or one of the M uplink carriers.

It may be understood that the above methods for identifying different frame structures may also be applied in the case that carriers are aggregated, including the case that one or multiple downlink carriers aggregated by paired carriers and unpaired carriers carry different frame structures.

It may also be understood that the new FDD frame structure indicated by embodiments of the present invention is not limited to a new FDD frame structure carrying uplink timeslots/subframes provided in the prior art, and also not limited to another new FDD frame structure carrying uplink timeslots/subframes provided by the present invention; as long as a new FDD frame structure ensures backward compatibility of the LTE-A network, the new FDD frame structure is applicable in the technical solutions provided in embodiments of the present invention.

It may be understood that the technical solutions provided by embodiments of the present invention is not limited to the LTE or LTE-A system, and may be directly applied in other communication systems such as a WCDMA (wideband code division multiple access) system and its enhanced system without adding a new process.

Figure 4:
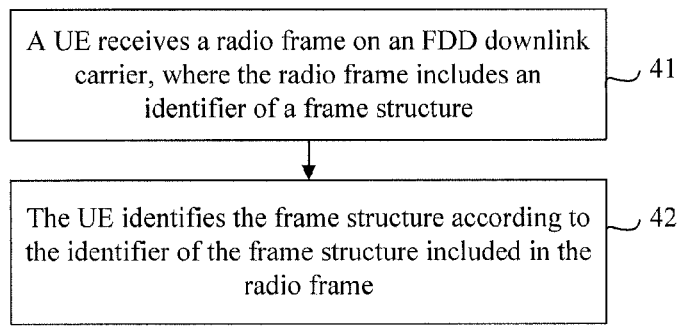
FIG. 4 is a schematic diagram illustrating a procedure of a method for identifying different frame structures according to an embodiment of the present invention.

To sum up, as shown in FIG. 4, a method for identifying different frame structures according to an embodiment of the present invention includes the following steps:

Step 41: A UE receives a radio frame on an FDD downlink carrier, where the radio frame includes an identifier of a frame structure.

Step 42: The UE identifies the frame structure according to the identifier of the frame structure included in the radio frame.

Step 42 may be specifically as follows: the UE detects the number of PSSs or SSSs included in the radio frame within a radio frame period; if the number is greater than the number of PSSs or SSSs included in the original synchronization structure, the UE identifies that the radio frame has a frame structure carrying an uplink SRS; if the number is the same as the number of PSSs or SSSs included in the original synchronization structure, the UE identifies that the radio frame has the original frame structure.

Alternatively, according to the direct indication of the reserved bit on the original PBCH or DBCH of the radio frame, the UE identifies that the radio frame has the original frame structure or has a frame structure carrying an uplink SRS.

Alternatively, according to the direct indication of the reserved state of the existing uplink/downlink subframe ratio field on the DBCH of the radio frame, the UE identifies that the radio frame has the original frame structure or has a frame structure carrying an uplink SRS.

The above methods for identifying frame structures correspond to the method embodiments respectively and are not further described.

On the basis of the above method embodiments, embodiments of the present invention provide a UE and an eNB respectively.

Figure 5:
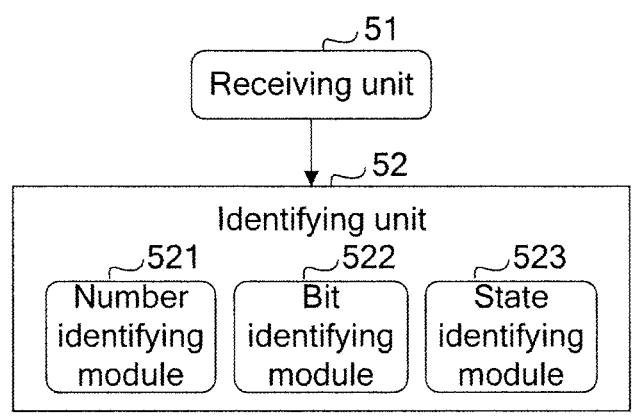
FIG. 5 is a schematic structure diagram of a UE according to an embodiment of the present invention.

As shown in FIG. 5, a UE provided in an embodiment of the present invention includes:
a receiving unit 51, configured to receive a radio frame on an FDD downlink carrier, where the radio frame includes an identifier of a frame structure; and
an identifying unit 52, configured to identify the frame structure according to the identifier of the frame structure included in the radio frame.

The identifying unit includes any one of the following modules:
a number identifying module 521, configured to: detect the number of PSSs or SSSs included in the radio frame within a radio frame period; if the number is greater than the number of PSSs or SSSs included in the original synchronization structure, identify that the radio frame has a frame structure carrying an uplink SRS; and if the number is the same as the number of PSSs or SSSs included in the original synchronization structure, identify that the radio frame has the original frame structure;
a bit identifying module 522, configured to identify, according to the direct indication of the reserved bit on the original PBCH or DBCH of the radio frame, that the radio frame has the original frame structure or has a frame structure carrying an uplink SRS; and
a state identifying module 523, configured to identify, according to the direct indication of the reserved state of the existing uplink/downlink subframe ratio field on the DBCH of the radio frame, that the radio frame has the original frame structure or has a frame structure carrying an uplink SRS.

Figure 6:
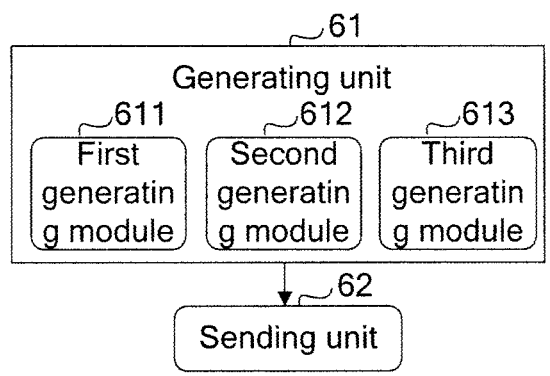
FIG. 6 is a schematic structure diagram of an eNB according to an embodiment of the present invention.

As shown in FIG. 6, an eNB provided in an embodiment of the present invention includes:
a generating unit 61, configured to generate a radio frame, where the radio frame includes an identifier of a frame structure; and
a sending unit 62, configured to send the radio frame generated by the generating unit on an FDD downlink carrier.

The generating unit 61 includes any one of the following modules:
a first generating module 611, configured to generate a radio frame, where the radio frame adds at least one PSS or SSS on the basis of the original synchronization structure;
a second generating module 612, configured to generate a radio frame, where the radio frame uses the reserved bit on the original PBCH or DBCH to directly indicate whether the radio frame has the original frame structure or has a frame structure carrying an uplink SRS; and
a third generating module 613, configured to generate a radio frame, where the radio frame uses the reserved state of the existing uplink/downlink subframe ratio field on the DBCH to directly indicate whether the radio frame has the original frame structure or has a frame structure carrying an uplink SRS.

Figure 7:
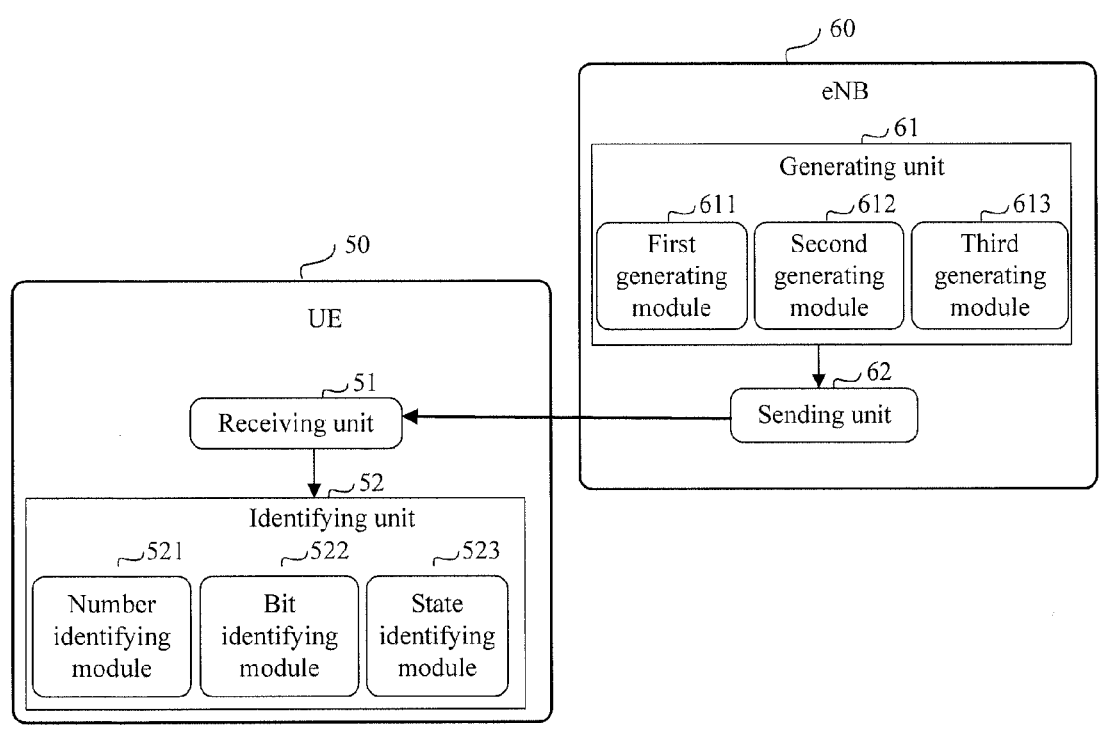
FIG. 7 is a schematic structure diagram of a system for identifying different frame structures according to an embodiment of the present invention.

Corresponding to the method embodiments, as shown in FIG. 7, an embodiment of the present invention further provides a system for identifying different frame structures. The system includes an eNB 60 and a UE 50.

The eNB 60 includes:
a generating unit 61, configured to generate a radio frame, where the radio frame includes an identifier of a frame structure; and
a sending unit 62, configured to send the radio frame generated by the generating unit on an FDD downlink carrier.

The UE 50 includes:
a receiving unit 51, configured to receive a radio frame on the FDD downlink carrier; and
an identifying unit 52, configured to identify the frame structure according to the identifier of the frame structure included in the radio frame.

For different method embodiments, more specifically, the generating unit 61 included by the eNB includes:
a first generating module 611, configured to generate a radio frame, where the radio frame adds at least one PSS or SSS on the basis of the original synchronization structure;
a second generating module 612, configured to generate a radio frame, where the radio frame uses the reserved bit on the original PBCH or DBCH to directly indicate whether the radio frame has the original frame structure or has a frame structure carrying an uplink SRS; and
a third generating module 613, configured to generate a radio frame, where the radio frame uses the reserved state of the existing uplink/downlink subframe ratio field on the DBCH to directly indicate whether the radio frame has the original frame structure or has a frame structure carrying an uplink SRS.

The identifying unit 52 included by the UE includes:
a number identifying module 521, configured to detect the number of PSSs or SSSs included in the radio frame within a radio frame period; if the number is greater than the number of PSSs or SSSs included in the original synchronization structure, identify that the radio frame has a frame structure carrying an uplink SRS; and if the number is the same as the number of PSSs or SSSs included in the original synchronization structure, identify that the radio frame has the original frame structure;
a bit identifying module 522, configured to identify, according to the direct indication of the reserved bit on the original PBCH or DBCH of the radio frame, that the radio frame has the original frame structure or has a frame structure carrying an uplink SRS; and
a state identifying module 523, configured to identify, according to the direct indication of the reserved state of the existing uplink/downlink subframe ratio field on the DBCH of the radio frame, that the radio frame has the original frame structure or has a frame structure carrying an uplink SRS.

Through the above technical solutions provided by embodiments of the present invention, the eNB adds at least one PSS or SSS on the basis of the original synchronization structure, or uses the reserved bit on the original PBCH or DBCH or uses the reserved state of the existing uplink/downlink subframe ratio field on the original DBCH to directly indicate the used frame structure; for the LTE user, because the bit reserved in the PBCH, or the bit or state reserved in the DBCH does not need to be parsed, the LTE user can access the network according to the original access procedure, and the LTE user can access the LTE-A network normally; the LTE user is not scheduled in the special subframes so as to ensure that the LTE user communicates with the LTE-A eNB normally, and to ensure backward compatibility of the LTE-A network. For the LTE-A user, by identifying the identifier of the frame structure included in the radio frame, the LTE-A user can identify the new frame structure when accessing the network initially, so as to perform normal communication.

Those skilled in the art may also be aware that the units and algorithm steps described herein may be implemented through electronic hardware, or computer software, or a combination of the electronic hardware and computer software. To clearly describe interchangeability of hardware and software, the components and steps of each embodiment are described above according to functions. Whether the functions are executed through hardware or software depends on the specific applications and design constraints of the technical solutions. Those skilled in the art may use different methods for each specific application to implement the described functions, but the implementation should not be regarded as beyond the scope of the present invention.

The steps of the method or algorithm described herein may be implemented through hardware, or through a software module executed by a processor, or through a combination of the hardware and the software module executed by a processor. The software module may be placed in a random access memory (RAM), a memory, a read only memory (ROM), an electrically programmable ROM, an electrically erasable programmable ROM, a register, a hard disk, a removable disk, a CD-ROM, or any other form of storage medium.

The preceding embodiments of the present invention are exemplary only and are not intended to limit the present invention. Any modification, equivalent substitution, and improvement without departing from the spirit and principle of the present invention should be covered in the protection scope of the present invention.

What is claimed is:

1. A method for identifying different frame structures, comprising:
receiving a radio frame on a frequency division duplex (FDD) downlink carrier, wherein the radio frame of the FDD downlink carrier comprises an identifier to differentiate a frame structure of the FDD downlink carrier that carries an uplink sound reference symbol (SRS) from another different FDD downlink carrier frame structure; and
identifying the frame structure of the FDD downlink carrier that carries the uplink SRS according to the identifier of the frame structure comprised in the radio frame of the FDD downlink carrier.

2. The method of claim 1, wherein the identifying the frame structure according to the identifier of the frame structure comprised in the radio frame is:
detecting a number of primary synchronization symbols (PSSs) or secondary synchronization symbols (SSSs) comprised in the radio frame within a radio frame period; if the number of PSSs or SSSs is greater than a number of PSSs or SSSs comprised in an original synchronization structure, identifying that the radio frame has a frame structure carrying the uplink SRS; and if the number of PSSs or SSSs is same as a number of PSSs or SSSs comprised in the original synchronization structure, identifying that the radio frame has the original frame structure.

3. The method of claim 1, wherein the identifying the frame structure according to the identifier of the frame structure comprised in the radio frame is:
according to a direct indication of a reserved bit on an original physical broadcast channel or dynamic broadcast channel of the radio frame, identifying that the radio frame has an original frame structure or has a frame structure carrying the uplink SRS.

4. The method of claim 1, wherein the identifying the frame structure according to the identifier of the frame structure comprised in the radio frame is:
according to a direct indication of a reserved state of an existing uplink/downlink subframe ratio field on a dynamic broadcast channel of the radio frame, identifying that the radio frame has an original frame structure or has a frame structure carrying the uplink SRS.

5. The method of claim 2, wherein the frame structure carrying the uplink SRS is:
a 10-ms radio frame comprising ten 1-ms subframes, inclusive of eight ordinary downlink subframes and two special subframes, wherein: an ordinary subframe comprises two 0.5-ms timeslots, and a special subframe comprises an uplink timeslot, a guard period, and/or a downlink timeslot, wherein the uplink timeslot may carry an SRS.

6. The method of claim 2, wherein the frame structure carrying the uplink SRS is:
a frame structure period comprising N 10-ms radio frames, wherein: a radio frame comprises ten 1-ms subframes; a frame structure period comprises at least one special subframe and comprises other ordinary subframes; an ordinary subframe comprises two 0.5-ms timeslots; the special subframe comprises an uplink timeslot, a guard period, and/or a downlink timeslot, wherein the uplink timeslot may carry an SRS.

7. A user equipment (UE), comprising:
a receiving unit, configured to receive a radio frame on a frequency division duplex (FDD) downlink carrier, wherein the radio frame of the FDD downlink carrier comprises an identifier to differentiate a frame structure of the FDD downlink carrier that carries an uplink sound reference symbol (SRS) from another different FDD downlink carrier frame structure; and
an identifying unit, configured to identify the frame structure of the FDD downlink carrier that carries the uplink SRS according to the identifier of the frame structure comprised in the radio frame of the FDD downlink carrier.

8. The UE of claim 7, wherein the identifying unit comprises any one of the following modules:
a number identifying module, configured to detect a number of primary synchronization symbols (PSSs) or secondary synchronization symbols (SSSs) comprised in the radio frame within a radio frame period; if the number of PSSs or SSSs is greater than a number of PSSs or SSSs comprised in an original synchronization structure, identify that the radio frame has a frame structure carrying the uplink SRS; and if the number of PSSs or SSSs is same as a number of PSSs or SSSs comprised in the original synchronization structure, identify that the radio frame has the original frame structure;
a bit identifying module, configured to identify, according to a direct indication of a reserved bit on an original physical broadcast channel (PBCH) or dynamic broadcast channel (DBCH) of the radio frame, that the radio frame has the original frame structure or has a frame structure carrying the uplink SRS; and a state identifying module, configured to identify, according to a direct indication of a reserved state of an existing uplink/downlink subframe ratio field on the DBCH of the radio frame, that the radio frame has the original frame structure or has a frame structure carrying the uplink SRS.

9. An evolved NodeB (eNB), comprising:
a generating unit, configured to generate a radio frame on a frequency division duplex (FDD) downlink carrier, wherein the radio frame comprises an identifier to differentiate frame structure of the FDD downlink carrier that carries an uplink sound reference symbol (SRS) from another different FDD downlink carrier frame structure; and
a sending unit, configured to send the generated radio frame on the FDD downlink carrier that carries the uplink SRS.

10. The eNB of claim 9, wherein the generating unit comprises any one of the following modules:
a first generating module, configured to generate a radio frame, wherein the radio frame adds at least one primary synchronization symbol (PSS) or at least one secondary synchronization symbol (SSS) on basis of an original synchronization structure;
a second generating module, configured to generate a radio frame, wherein the radio frame uses a reserved bit on an original physical broadcast channel (PBCH) or dynamic broadcast channel (DBCH) to directly indicate whether the radio frame has the original frame structure or has a frame structure carrying the uplink SRS; and
a third generating module, configured to generate a radio frame, wherein the radio frame uses a reserved state of an existing uplink/downlink subframe ratio field on the DBCH to directly indicate whether the radio frame has the original frame structure or has a frame structure carrying the uplink SRS.

11. A system for identifying different frame structures, comprising an evolved NodeB (eNB) and a user equipment (UE), wherein:
the eNB comprises:
a generating unit, configured to generate a radio frame on a frequency division duplex (FDD) downlink carrier, wherein the radio frame comprises an identifier to differentiate a frame structure of the FDD downlink carrier that carries an uplink sound reference symbol (SRS) from another different FDD downlink carrier frame structure; and
a sending unit, configured to send the generated radio frame on the FDD downlink carrier that carries the uplink SRS;
the UE comprises:
a receiving unit, configured to receive the radio frame on the FDD downlink carrier that carries the uplink SRS from another different FDD downlink carrier frame structure; and
an identifying unit, configured to identify the frame structure of the FDD downlink carrier that carries the uplink SRS according to the identifier of the frame structure comprised in the radio frame of the FDD downlink carrier.

12. The system of claim 11, wherein the generating unit comprised by the eNB comprises:
a first generating module, configured to generate a radio frame, wherein the radio frame adds at least one primary synchronization symbol (PSS) or secondary synchronization symbol (SSS) on basis of an original synchronization structure;
a second generating module, configured to generate a radio frame, wherein the radio frame uses a reserved bit on an original physical broadcast channel (PBCH) or dynamic broadcast channel (DBCH) to directly indicate whether the radio frame has the original frame structure or has a frame structure carrying the uplink SRS; and
a third generating module, configured to generate a radio frame, wherein the radio frame uses a reserved state of an existing uplink/downlink subframe ratio field on the DBCH to directly indicate whether the radio frame has the original frame structure or has a frame structure carrying the uplink SRS.

13. The system of claim 11, wherein the identifying unit comprised by the UE comprises:
a number identifying module, configured to: detect a number of primary synchronization symbols (PSSs) or secondary synchronization symbols (SSSs) comprised in the radio frame within a radio frame period; if the number of PSSs or SSSs is greater than a number of PSSs or SSSs comprised in an original synchronization structure, identify that the radio frame has a frame structure carrying the uplink SRS; and if the number of PSSs or SSSs is same as a number of PSSs or SSSs comprised in the original synchronization structure, identify that the radio frame has the original frame structure;
a bit identifying module, configured to identify, according to a direct indication of a reserved bit on an original physical broadcast channel (PBCH) or dynamic broadcast channel (DBCH) of the radio frame, that the radio frame has the original frame structure or has a frame structure carrying the uplink SRS; and
a state identifying module, configured to identify, according to a direct indication of a reserved state of an existing uplink/downlink subframe ratio field on the DBCH of the radio frame, that the radio frame has the original frame structure or has a frame structure carrying the uplink SRS.

14. A method for sending a radio frame, comprising:
generating, by a evolved NodeB (eNB), a radio frame on a frequency division duplex (FDD) downlink carrier, wherein the radio frame comprises an identifier to differentiate a frame structure of the FDD downlink carrier that carries an uplink sound reference symbol (SRS) from another different FDD downlink carrier frame structure;
sending, by the eNB, the generated radio frame on the FDD downlink carrier that carries the uplink SRS.

15. The method of claim 14, wherein the generating a radio frame comprises:
adding, by the eNB, at least one primary synchronization symbol (PSS) or at least one secondary synchronization symbol (SSS) on basis of an original synchronization structure.

16. The method of claim 14, wherein the generating a radio frame comprises:
using, by the eNB, a reserved bit on an original physical broadcast channel (PBCH) or dynamic broadcast channel (DBCH) to directly indicate whether the radio frame has the original frame structure or has a frame structure carrying the uplink SRS.

17. The method of claim 14, wherein the generating a radio frame comprises:
using, by the eNB, a reserved state of an existing uplink/downlink subframe ratio field on the DBCH to directly indicate whether the radio frame has the original frame structure or has a frame structure carrying the uplink SRS.

* * * * *